US012802862B2

(12) United States Patent
Muneuchi et al.

(10) Patent No.: US 12,802,862 B2
(45) Date of Patent: Nov. 17, 2026

(54) INDUCTOR AND METHOD FOR MANUFACTURING INDUCTOR

(71) Applicant: Murata Manufacturing Co., Ltd., Kyoto-fu (JP)

(72) Inventors: Keita Muneuchi, Nagaokakyo (JP); Hideaki Ooi, Nagaokakyo (JP); Yoshiharu Satou, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 664 days.

(21) Appl. No.: 18/366,502

(22) Filed: Aug. 7, 2023

(65) Prior Publication Data

US 2024/0071676 A1 Feb. 29, 2024

(30) Foreign Application Priority Data

Aug. 30, 2022 (JP) ................................. 2022-136631

(51) Int. Cl.

| | |
|---|---|
| ***H01F 27/29*** | (2006.01) |
| ***H01F 27/255*** | (2006.01) |
| ***H01F 27/28*** | (2006.01) |
| ***H01F 41/02*** | (2006.01) |
| ***H01F 41/04*** | (2006.01) |

(52) U.S. Cl.

CPC ....... *H01F 27/255* (2013.01); *H01F 27/2823* (2013.01); *H01F 41/0246* (2013.01); *H01F 41/04* (2013.01); *H01F 27/292* (2013.01)

(58) Field of Classification Search

CPC ...... H01F 27/22; H01F 27/025; H01F 27/263; H01F 30/06

See application file for complete search history.

(56) References Cited

U.S. PATENT DOCUMENTS

| | | | | |
|---|---|---|---|---|
| 11,676,755 | B2 * | 6/2023 | Tonogai | H01F 41/0246 336/192 |
| 2016/0012961 | A1 * | 1/2016 | Suzuki | H01F 27/29 29/602.1 |
| 2019/0122809 | A1 * | 4/2019 | Mimura | H01F 27/29 |

(Continued)

FOREIGN PATENT DOCUMENTS

| | | |
|---|---|---|
| JP | 2015-046494 A | 3/2015 |
| JP | 2018-085459 A | 5/2018 |

(Continued)

*Primary Examiner* — Mang Tin Bik Lian

(74) *Attorney, Agent, or Firm* — Studebaker Brackett PLLC

(57) ABSTRACT

An inductor includes a base body including a coil conductor and a core in which the coil conductor is embedded. The coil conductor includes a wound band-shaped conductive wire. The core contains soft magnetic particles and a resin. The base body is rectangular-parallelepiped-shaped and includes a pair of principal faces that are opposite to each other, a pair of end faces that are opposite to each other and adjacent to the principal faces, and a pair of side faces that are opposite to each other and adjacent to the principal faces. A base-body protection layer is on a surface of the base body. The coil conductor includes a wound section and extended sections extending from the wound section. The extended sections have surfaces exposed on the surface of the base body at respective exposed portions on each of which a metal layer that is an outer electrode is formed.

6 Claims, 6 Drawing Sheets

(56) References Cited

U.S. PATENT DOCUMENTS

| | | | | |
|---|---|---|---|---|
| 2020/0312519 | A1* | 10/2020 | Sasajima | H01F 27/06 |
| 2020/0312520 | A1* | 10/2020 | Sasajima | H01F 41/04 |
| 2021/0098183 | A1* | 4/2021 | Araki | H01F 41/127 |
| 2021/0098185 | A1* | 4/2021 | Gibu | H01F 27/29 |

FOREIGN PATENT DOCUMENTS

| | | | |
|---|---|---|---|
| JP | 2020-191364 | A | 11/2020 |
| WO | 2017/135057 | A1 | 8/2017 |

* cited by examiner

INDUCTOR AND METHOD FOR MANUFACTURING INDUCTOR

CROSS-REFERENCE TO RELATED APPLICATION

This application claims benefit of priority to Japanese Patent Application No. 2022-136631, filed Aug. 30, 2022, the entire content of which is incorporated herein by reference.

BACKGROUND

Technical Field

The present disclosure relates to an inductor and a method for manufacturing the inductor.

Background Art

Japanese Unexamined Patent Application Publication No. 2018-85459 describes a coil component including a base body containing magnetic particles and a resin and a coil conductor embedded in the base body. Extended portions that extend from the coil conductor are exposed on the base body, and outer electrodes are formed on the exposed portions by plating.

According to the coil component described in Japanese Unexamined Patent Application Publication No. 2018-85459, plating is performed to ensure sufficient joining strength between the extended portions of the coil conductor and the outer electrodes. However, it is desirable to further increase the peel strength of external terminals.

SUMMARY

Accordingly, the present disclosure provides a coil component including a base body containing magnetic particles and a resin, a coil conductor embedded in the base body, and an outer electrode electrically connected to the coil conductor, the outer electrode having an increased peel strength.

According to an aspect of the present disclosure, an inductor includes a base body including a coil conductor and a core in which the coil conductor is embedded, the coil conductor including a band-shaped conductive wire that is wound, the core containing soft magnetic particles and a resin. The base body is rectangular-parallelepiped-shaped and includes a pair of principal faces that are opposite to each other, a pair of end faces that are opposite to each other and adjacent to the principal faces, and a pair of side faces that are opposite to each other and adjacent to the principal faces. A base-body protection layer is formed on a surface of the base body. The coil conductor includes a wound section and a pair of extended sections extending from the wound section, the extended sections having surfaces exposed on the surface of the base body at respective exposed portions on each of which a metal layer that is an outer electrode is formed by plating. The metal layer of the outer electrode is formed on an electrode formation section, which is not covered by the base-body protection layer, and on the base-body protection layer along an outer edge of the electrode formation section, and is also formed to extend into the base body at a boundary between the electrode formation section and the base-body protection layer.

According to another aspect of the present disclosure, a method for manufacturing an inductor includes a coil conductor formation step of forming a coil conductor by winding a band-shaped conductive wire; a base body molding step of molding a base body by embedding the coil conductor in a core containing soft magnetic particles and a resin and compressing the core, the coil conductor being embedded such that a surface of an extended section extending from a wound section of the coil conductor is exposed on a surface of the core; and a base-body protection layer formation step of forming a base-body protection layer on an entire surface of the base body. The method further includes a step of forming an electrode formation section by irradiating an area including an exposed portion at which the surface of the extended section is exposed with laser light to remove the base-body protection layer; and a step of forming a metal layer that is an outer electrode on the electrode formation section including the exposed portion. The metal layer of the outer electrode is formed on the electrode formation section and on the base-body protection layer along an outer edge of the electrode formation section, and is also formed to extend into the base body at a boundary between the electrode formation section and the base-body protection layer.

According to the present disclosure, the outer electrode is formed on the exposed portion, which extends from the wound section of the coil conductor, and the base-body protection layer and extends into the base body. Therefore, the outer electrode is strongly joined to the base body, and the peel strength of an external terminal can be increased.

DETAILED DESCRIPTION

An embodiment of the present disclosure will be described with reference to the drawings.

Figure 1:
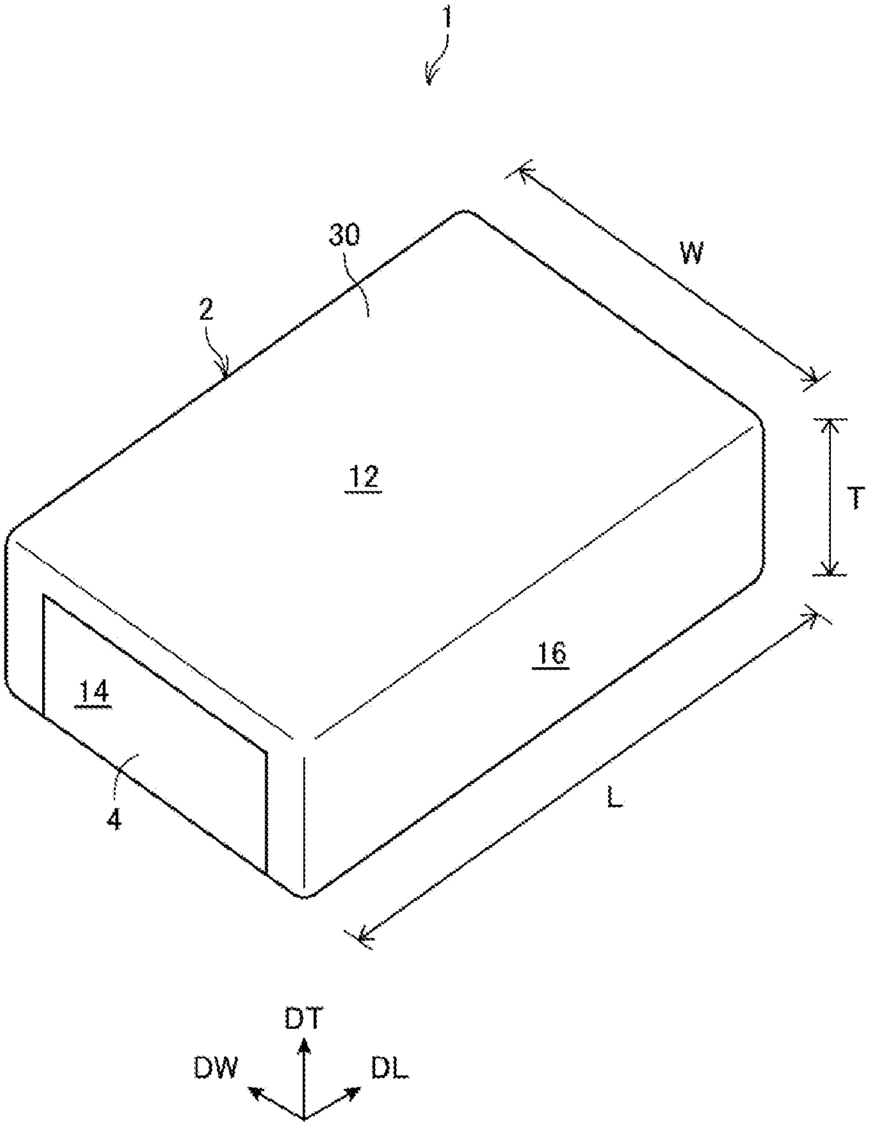
FIG. 1 is a perspective view of an inductor according to an embodiment of the present disclosure viewed from above a top face.
Figure 2:
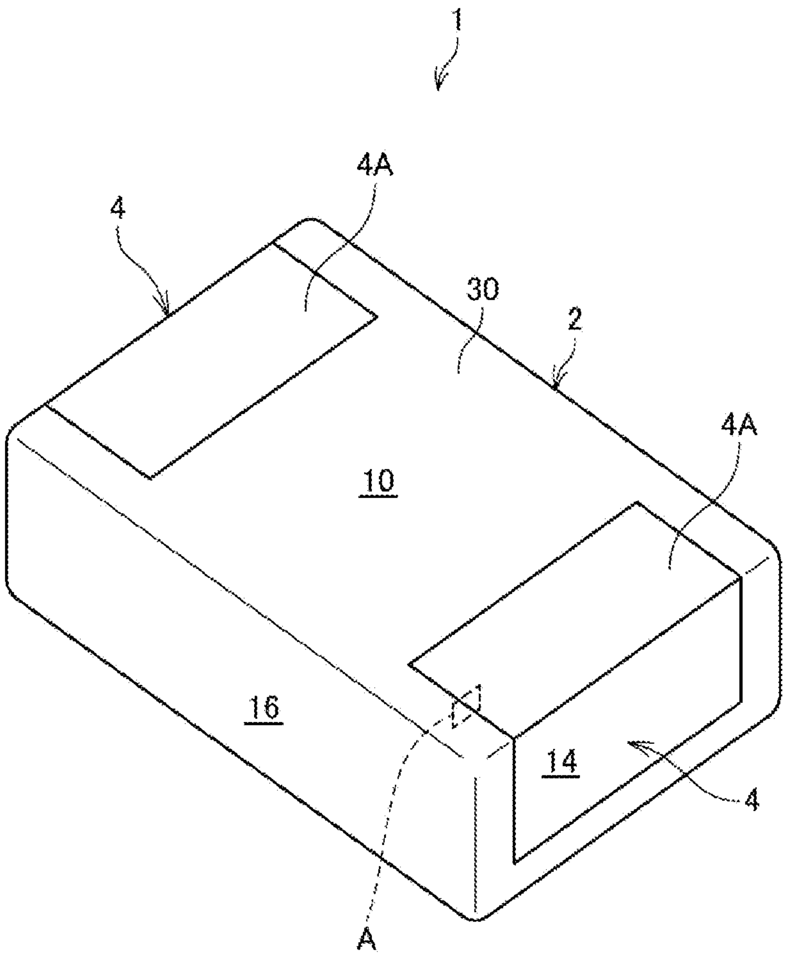
FIG. 2 is a perspective view of the inductor viewed from below a bottom face.

FIG. 1 is a perspective view of an inductor according to the present embodiment viewed from above a top face 12. FIG. 2 is a perspective view of the inductor viewed from below a bottom face 10.

The inductor according to the present embodiment is configured as a surface-mounted electronic component, and includes a base body 2 having a substantially rectangular parallelepiped shape, which is an example of a substantially hexahedron shape, and a pair of outer electrodes 4 provided on a surface of the base body 2.

In the following description, a first principal face of the base body 2 that faces a mounting board (not illustrated) in a mounting process is defined as the bottom face 10, a second principal face that is opposite to the bottom face 10 as the top face 12, a pair of third principal faces orthogonal to the bottom face 10 as end faces 14, and a pair of fourth principal faces orthogonal to the bottom face 10 and the pair of end faces 14 as side faces 16.

As illustrated in FIG. 1, the distance from the bottom face 10 to the top face 12 is defined as a thickness T of the base body 2, the distance between the pair of side faces 16 as a width W of the base body 2, and the distance between the pair of end faces 14 as a length L of the base body 2. The direction of the thickness T is defined as a thickness direction DT, the direction of the width W as a width direction DW, and the direction of the length L as a length direction DL. The thickness direction DT is a direction normal to the top face 12 and the bottom face 10. The width direction DW is a direction normal to the side faces 16. The length direction DL is a direction normal to the end faces 14.

The inductor has, for example, a length L of 2.0 mm, a width W of 1.6 mm, and a thickness T of 1.1 mm.

Figure 3:
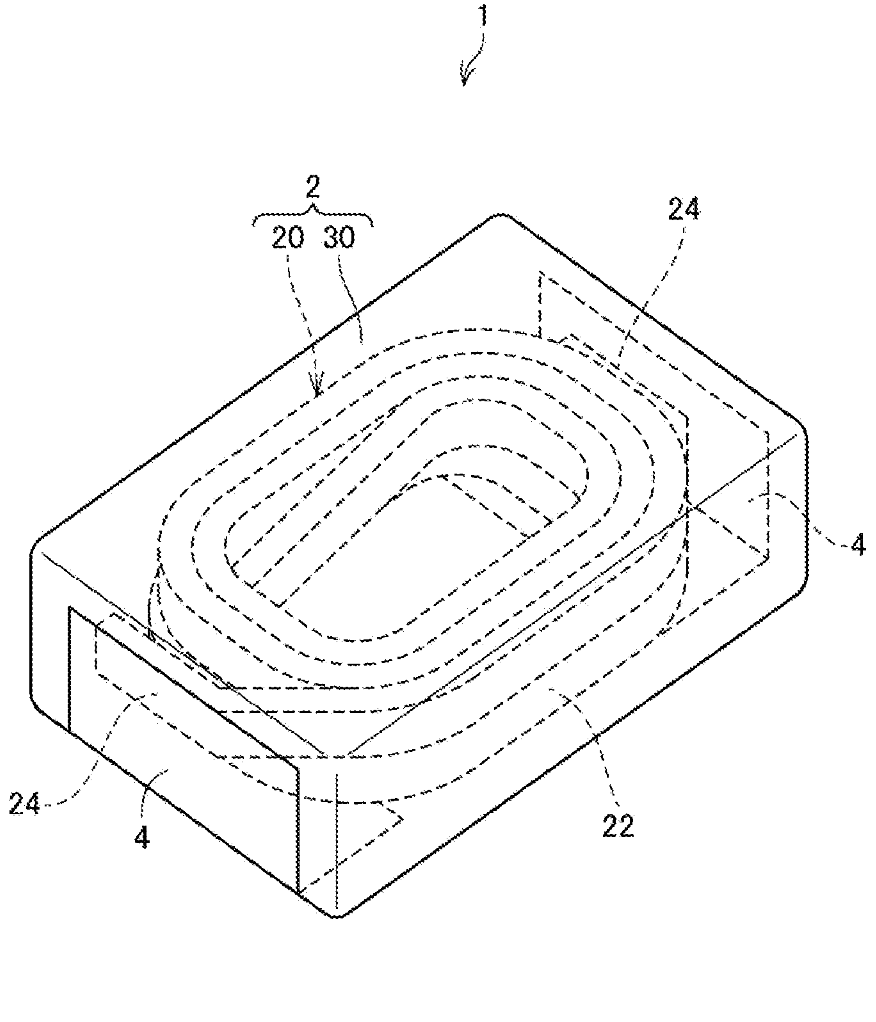
FIG. 3 is a see-through perspective view illustrating the internal structure of the inductor.

FIG. 3 is a see-through perspective view illustrating the internal structure of the inductor.

The base body 2 includes a coil conductor 20 and a core 30 having a substantially hexahedron shape in which the coil conductor 20 is embedded. The base body 2 is configured as a molded inductor in which the coil conductor 20 is sealed in the core 30.

The core 30 is a compression-molded body formed in a substantially hexahedron shape by applying heat and pressure to mixed powder containing soft magnetic particles and a resin while the coil conductor 20 is embedded in the mixed powder.

In the present embodiment, the soft magnetic particles contain two types of particles having different particle sizes: first magnetic particles that are large particles having a relatively large average particle size, and second magnetic particles that are small particles having a relatively small average particle size. Accordingly, during compression molding, the second magnetic particles, which are small particles, enter the spaces between the first magnetic particles, which are large particles, together with the resin. Thus, the packing fraction of the magnetic particles in the core 30 can be increased, and the core 30 can have a higher magnetic permeability.

In the present embodiment, the first magnetic particles and the second magnetic particles include metal particles having average particle sizes of 24.4 μm and 1.7 μm, respectively. The average particle size of the first magnetic particles is preferably 7 μm or more and 60 μm or less (i.e., from 7 μm to 60 μm), and the average particle size of the second magnetic particles is preferably 1 μm or more and 4 μm or less (i.e., from 1 μm to 4 μm). The magnetic particles may further contain particles having an average particle size different from those of the first magnetic particles and the second magnetic particles. Thus, the magnetic particles may contain three or more types of particles having different particle sizes.

Both the first magnetic particles and the second magnetic particles are particles including metal particles whose surfaces are covered with an insulating film having a film thickness of several nanometers or more and several tens of nanometers or less (i.e., from several nanometers to several tens of nanometers). Since the metal particles are covered with the insulating film, the insulation resistance and the withstand voltage can be increased.

The first magnetic particles according to the present embodiment are formed by using Fe—Si—B amorphous alloy powder as the metal particles and a film of zinc phosphate glass having a thickness of 10 nm or more and 50 nm or less (i.e., from 10 nm to 50 nm) as the insulating film. The second magnetic particles according to the present embodiment are formed by using carbonyl iron powder as the metal particles and a silica film having a thickness of 5 nm or more and 15 nm or less (i.e., from 5 nm to 15 nm) as the insulating film.

The material of the resin contained in the mixed powder according to the present embodiment is an epoxy resin containing phenol alkyl epoxy resin as the base resin.

In the present embodiment, the mixed powder contains 75±10 wt % of the first magnetic particles, 25±10 wt % of the second magnetic particles, and 2.7 wt % or more and 3.5 wt % or less (i.e., from 2.7 wt % to 3.5 wt %) of the resin.

As illustrated in FIG. 3, the coil conductor 20 includes a wound section 22 in which a conductive wire is wound and a pair of extended sections 24 extending from the wound section 22.

The coil conductor 20 includes the conductive wire and a covering layer formed on a surface of the conductive wire. The conductive wire is a band-shaped conductive wire (so-called flat conductive wire) made of copper and having a rectangular cross section. The conductive wire has a thickness of 18 μm or more and 90 μm or less (i.e., from 18 μm to 90 μm) and a width of 240 μm or more and 340 μm or less (i.e., from 240 μm to 340 μm). The covering layer includes an insulating layer formed on a surface of the band-shaped conductive wire and a fusion layer formed on a surface of the insulating layer. The fusion layer serves to join overlapping portions of the band-shaped conductive wire in the wound section 22. The insulating layer is made of a polyimide-amide resin and has a thickness of 6±2 μm. The fusion layer is made of a polyimide resin and has a thickness of 2.5±1.0 μm. The coil conductor may have curved thickness surfaces. When the thickness surfaces are curved, the width of the conductive wire covers the regions in which the thickness surfaces are curved.

The wound section 22 of the coil conductor 20 is formed by winding the conductive wire in a helical shape so that both ends of the band-shaped conductive wire (hereinafter also referred to simply as a conductive wire) extend to the outer periphery and that portions thereof are connected to each other at the inner periphery. In the base body 2, the coil conductor 20 is embedded in the core 30 in an orientation such that a central axis of the wound section 22 extends in the thickness direction DT of the base body 2. The extended sections 24 extend from the wound section 22 to respective ones of the pair of end faces 14. One principal face of the band-shaped conductive wire of each extended section 24 is exposed on the base body 2, and the other principal face is embedded in the base body 2. The one principal face of the band-shaped conductive wire of each extended section 24 that is exposed on the base body 2 is electrically connected to a corresponding one of the outer electrodes 4.

Each of the pair of outer electrodes 4 is a so-called L-shaped electrode composed of an L-shaped member extending from a corresponding one of the end faces 14 of the base body 2 to the bottom face 10. The outer electrodes 4 are connected to respective ones of the extended sections 24 of the coil conductor 20 on the end faces 14. Portions 4A (FIG. 2) of the outer electrodes 4 extending along the bottom face 10 are electrically connected to wiring lines on a circuit board by appropriate mounting means, such as solder.

A base-body protection layer (not illustrated) is formed on the surface of the base body 2 over regions excluding the regions in which the outer electrodes 4 are provided. The base-body protection layer is made of, for example, a phenoxy resin and a novolak resin and contains nano silica as a filler. The base-body protection layer is formed on the surface of the base body 2 to a thickness of 10 μm or more and 30 μm or less (i.e., from 10 μm to 30 μm).

According to the inductor having the above-described structure, direct-current superposition characteristics can be improved by using magnetic particles made of a soft magnetic material. Accordingly, the inductor may be used as an electronic component of an electric circuit through which a large current flows, or as a choke coil of a DC-DC converter circuit or a power supply circuit. The inductor may also be used as an electronic component of an electronic device, such as a personal computer, a DVD player, a digital camera, a television set, a cellular phone, a smartphone, a car electronic device, or a medical or industrial device. The application of the inductor is not limited to this, and the inductor may also be used in, for example, a tuning circuit, a filter circuit, or a rectifying-smoothing circuit.

Figure 4:
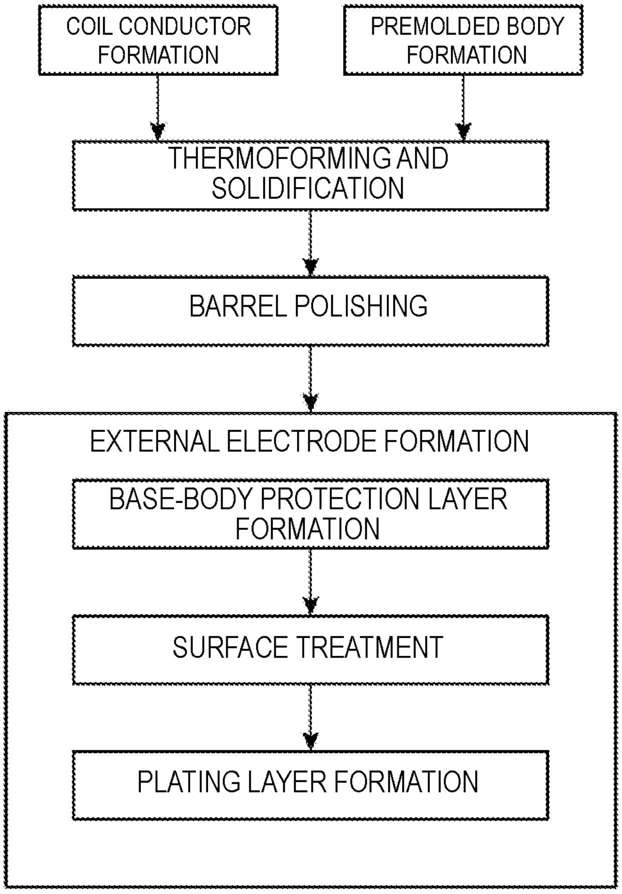
FIG. 4 is a flowchart of steps for manufacturing the inductor.

FIG. 4 is a flowchart of steps for manufacturing the inductor.

As illustrated in FIG. 4, the steps for manufacturing the inductor includes a coil conductor formation step, a premolded body formation step, a thermoforming-and-solidification step, a barrel polishing step, and an outer electrode formation step.

In the coil conductor formation step, the conductive wire is formed into the coil conductor 20. In this step, the coil conductor 20 having a shape including the above-described wound section 22 and the pair of extended sections 24 is formed by winding the conductive wire by a winding method called "alpha winding" (α winding). Alpha winding is a winding method in which the conductive wire, which serves as a conductor, is spirally wound in each layer of two layers so that the extended sections 24 at the starting and finishing ends are positioned at the outer periphery. The number of turns of the coil conductor 20 is not particularly limited.

In the premolded body formation step, premolded bodies called tablets are formed.

The premolded bodies are bodies formed by compressing the above-described mixed powder, which is the material of the base body 2, into a solid shape that is easy to handle. In the present embodiment, two types of tablets, which are a first tablet and a second tablet, are formed. The first tablet has an appropriate shape (for example, an E-shape) including a groove for receiving the coil conductor 20. The second tablet has an appropriate shape (for example, an I-shape or a plate shape) that covers the groove in the first tablet.

In the thermoforming-and-solidification step, the first tablet, the coil conductor 20, and the second tablet are placed in a mold and pressed in a direction in which the first and second tablets are stacked while heat is applied thereto, so that the first and second tablets are solidified. As a result, the first tablet, the coil conductor 20, and the second tablet are integrated together. Thus, the base body 2 in which the coil conductor 20 is embedded in the core 30 is formed. The thermoforming-and-solidification step corresponds to a base body molding step in the present disclosure.

In the barrel polishing step, the molded body is subjected to barrel polishing. As a result of this step, the corners of the base body 2 are rounded.

In the outer electrode formation step, the outer electrodes 4 are formed on the core 30. The outer electrode formation step includes a base-body protection layer formation step, a surface treatment step, and a plating layer formation step.

In the base-body protection layer formation step, the molded body is coated with an insulating resin over the entire surface thereof. As a result of this step, a base-body protection layer made of the insulating resin is formed, for example, over the entire surface of the molded body.

In the surface treatment step, the surface of the core 30 is irradiated with light in electrode formation regions, so that the surface is reformed in the electrode formation regions. The electrode formation regions are regions of the surface of the core 30 in which the outer electrodes 4 are to be formed. These regions include regions in which the extended sections 24 are exposed. More specifically, the surface of the core 30 is irradiated with laser light so that, in the electrode formation regions, the base-body protection layer on the surface of the core 30 and the covering layer of the extended sections 24 of the coil conductor 20 are removed. In addition, the resin on the surface of the core 30 is removed, and the insulating film on the surfaces of the magnetic particles exposed on the core 30 is also removed. As a result, the area of the regions in which the metal of the magnetic particles is exposed on the surface of the core 30 per unit area is greater in the electrode formation regions than in other regions of the surface of the core 30. After the irradiation with laser light, a cleaning process (for example, an etching process) may be performed to clean the surface in the electrode formation regions.

In the plating layer formation step, the surface of the core 30 is plated with copper by barrel plating, so that a copper plating layer is formed in the electrode formation regions that have been irradiated with laser light. A Ni plating layer made of nickel (Ni) and a Sn plating layer made of tin (Sn) may be additionally formed on the copper plating layer. A layer of aluminum (Al), silver (Ag), gold (Au), or palladium (Pd) may be formed instead of the layer of copper (Cu).

As a result of the above-described outer electrode formation step, the outer electrodes 4 composed of the above-described plating layers are formed. Each outer electrode 4 is not limited to the L-shaped electrode, and may be a so-called five-sided electrode that extends over the entirety of the corresponding end face 14 and portions of the bottom face 10, the top face 12, and the pair of side faces 16 adjacent to the end face 14.

Figure 5:
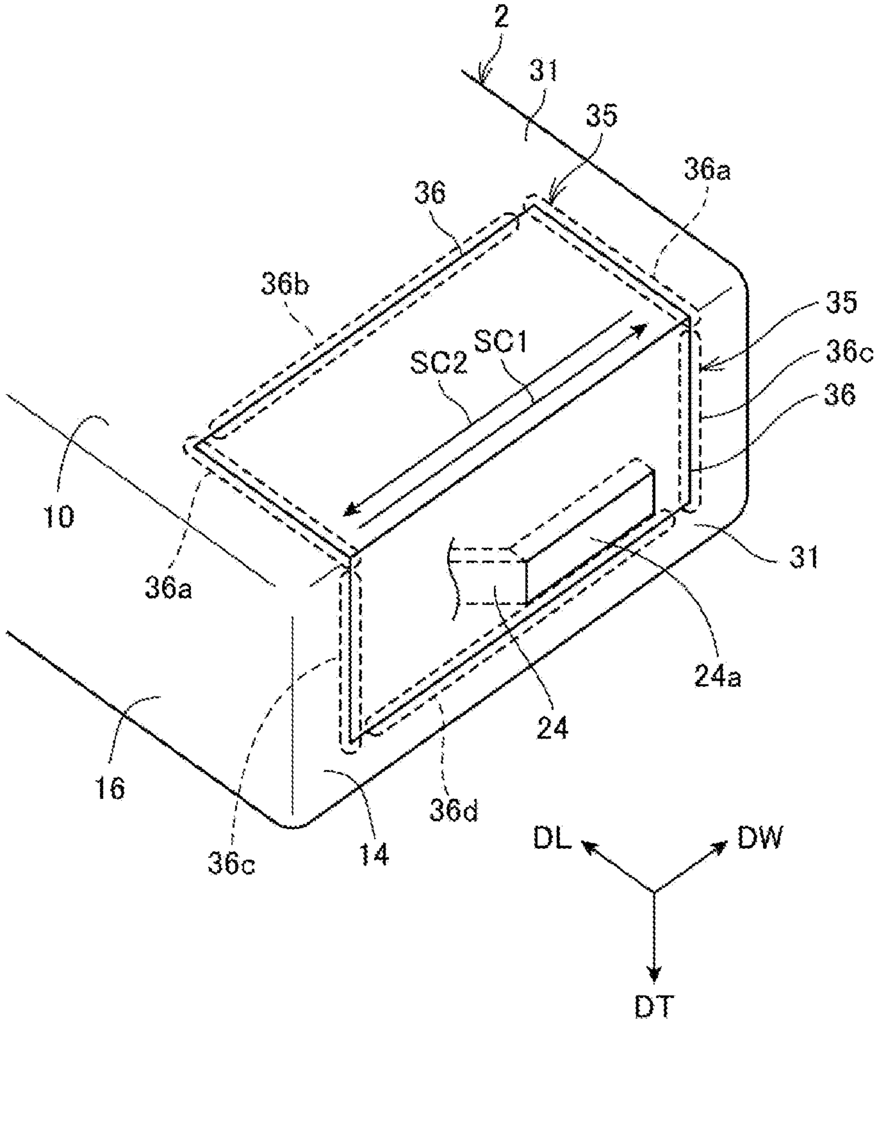
FIG. 5 is a perspective view of a base body after a surface treatment step viewed from below the bottom face.

FIG. 5 is a perspective view of the base body 2 after the surface treatment step viewed from below the bottom face 10.

The extended section 24 has an exposed portion **24*a* exposed on the end face 14 of the base body 2. Although FIG. 5 shows only one of the pair of end faces 14 of the base body 2, the other end face 14 has a similar structure. The exposed portion 24*a* is a portion in which a surface of the extended section 24 is exposed on the surface of the base body 2** after the barrel polishing step.

In the surface treatment step, an area extending along the end face 14 and the bottom face 10 is irradiated with laser light. As described above, the bottom face 10, the top face 12, the pair of end faces 14, and the pair of side faces 16 are covered with a base-body protection layer 31. In the surface treatment step, the surfaces of the base-body protection layer 31 and the exposed portion **24*a* are removed by irradiation with laser light in the region in which the outer electrode 4 is to be formed. As a result of the irradiation with laser light, an electrode formation section 35 extending along the bottom face 10 and the end face 14 and having an L-shaped cross section is formed. The resin and soft magnetic particles that form the core 30 and the exposed portion 24*a* are exposed in the electrode formation section 35. The electrode formation section 35 corresponds to the above-described electrode formation region. A region inside and near (for example, within 10 μm from) the boundary between the electrode formation section 35 and the region in which the base-body protection layer 31 is not removed is referred to as an outer edge 36 of the electrode formation section 35**.

In the surface treatment step, the surface of the base body 2 is scanned with laser light focused thereon, so that the covering layer of the exposed portion 24*a* and the base-body protection layer 31 on the surface of the base body 2 are removed. At this time, depending on the energy and irradiation time of the laser light, not only the base-body protection layer 31 but also the resin and some of the soft magnetic particles of the core 30 are removed from the surface of the base body 2. When the depth to which a portion of the base body 2 is removed by the laser light is defined as a processing amount, the processing amount is greater than the thickness of the base-body protection layer 31, so that the core 30 is reached. In this case, the core 30 is removed in the electrode formation section 35.

Scanning of the laser light is performed by, for example, alternately repeating first scanning SC1 in a direction along the width direction DW and second scanning SC2 in a direction opposite to the direction of the first scanning SC1.

For example, assume that the outer edge 36 formed on the bottom face 10 includes outer edges 36*a* that extend in the length direction DL and an outer edge 36*b* that extends in the width direction DW. The processing amount is increased at the outer edges 36*a*, which are turning points between the first scanning SC1 and the second scanning SC2, and the core 30 is removed accordingly.

In the surface treatment step, the outer edge 36*b* is not a turning point at which the scanning direction of the laser light is changed. However, the processing amount at the outer edge 36*b* can be increased by increasing the output or the irradiation time of the laser light directed to the outer edge 36*b* beyond those in the electrode formation section 35 excluding the outer edge 36*b*. In this case, the resin and the soft magnetic particles of the core 30 are removed by the laser light at the outer edge 36*b* in a manner similar to that at the outer edges 36*a*.

This applies similarly to the outer edge 36 of the electrode formation section 35 on the end face 14. Assume that the outer edge 36 on the end face 14 includes outer edges 36*c* that extend in the thickness direction DT and an outer edge 36*d* that extends in the width direction DW. The outer edges 36*c* are turning points between the first scanning SC1 and the second scanning SC2, so that the processing amount is increased and the core 30 is removed accordingly. The outer edge 36*d* is not a turning point of the laser light, and therefore the processing amount is less than that at the outer edges 36*c*. However, the processing amount at the outer edge 36*d* can be increased by increasing the output or the irradiation time of the laser light.

Figure 6:
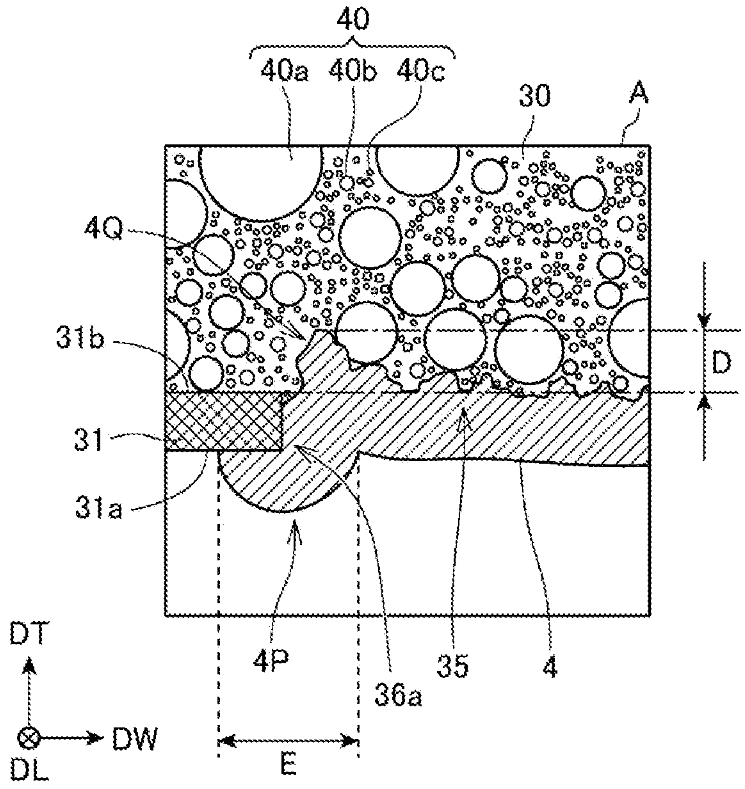
FIG. 6 is a sectional view of a relevant part at position A in FIG. 2.

FIG. 6 is a sectional view of a relevant part at position A in FIG. 2. The part illustrated in FIG. 6 includes the outer edge 36*a*, which is the boundary between the electrode formation section 35 and the base-body protection layer 31, on the bottom face 10 after the outer electrode 4 is formed in the plating layer formation step.

The core 30 includes soft magnetic particles 40 including first magnetic particles 40*a* having large particle sizes and second magnetic particles 40*b* and 40*c* having particle sizes less than those of the first magnetic particles 40*a*. In the plating layer formation step, the outer electrode 4 is formed on the surface of the core 30. The outer electrode 4 is formed on the electrode formation section 35, and is also formed on the base-body protection layer 31.

One of the pair of surfaces of the base-body protection layer 31 at the surface of the base body 2 is denoted by 31*a*, and the other surface that is adjacent to the core 30 is denoted by 31*b*. As shown by 4P in FIG. 6, a portion of the outer electrode 4 overlaps the surface 31*a* of the base-body protection layer 31. This portion is referred to as an overlapping portion 4P. The overlapping portion 4P is a portion of the outer electrode 4 and is joined to the surface 31*a*. The overlapping portion 4P has a length E of, for example, 5 μm or more and 10 μm or less (i.e., from 5 μm to 10 μm).

The outer electrode 4 is not only formed on the surface layer of the electrode formation section 35 but is also formed to extend into the core 30. The portion extending into the core 30 is referred to as an intrusive portion 4Q. The intrusive portion 4Q is formed adjacent to the surface 31*b* of the base-body protection layer 31 and extends into the core 30 in a wedge shape. In other words, the metal layer of the outer electrode 4 extends into the base body 2 in the intrusive portion 4Q.

The intrusive portion 4Q is formed in the plating layer formation step because, for example, a deep recess is formed in the core 30 by the laser light directed to the outer edge 36*a* in the surface treatment step. More specifically, when a metal layer is formed on the electrode formation section 35 by plating, the metal layer grows to fill the recess formed at the outer edge 36*a*, and the intrusive portion 4Q is formed accordingly.

The size of the intrusive portion 4Q can be assessed based on, for example, a depth D to which the intrusive portion 4Q extends into the core 30 beyond the surface 31*b*. As illustrated in FIG. 6, the depth D is the distance between the surface 31*b* and an end of the intrusive portion 4Q at the deepest position in the core 30. The depth D is, for example, 5.0 μm or more and 12.2 μm or less (i.e., from 5.0 μm to 12.2 μm). The depth D and the length E of the overlapping portion 4P can be determined by observing a cross section parallel to a plane that passes through the center of the base body 2 and whose normal is the width direction DW under a microscope.

The outer electrode 4 is joined to the electrode formation section 35, and the overlapping portion 4P is joined to 61, so that the outer electrode 4 is strongly joined to the base body 2. Since the intrusive portion 4Q extends into the core 30 in a wedge shape, the intrusive portion 4Q and the core 30 provide an anchoring effect against a force that separates the outer electrode 4 from the base body 2. Thus, the peel strength of the outer electrode 4 of the inductor 1 is increased. As a result, the outer electrode 4 is not easily separated from the exposed portion 24*a* of the coil conductor 20, and has a high joining strength. The effect of increasing the peel strength of the outer electrode 4 provided by the intrusive portion 4Q is significant when the depth D is 5.0 μm or more. When the depth D is greater than 12.2 μm, which is half the average particle size of the large particles, the surface roughness of the electrode formation region is increased and the outer electrode cannot be appropriately formed.

In the inductor 1, the intrusive portion 4Q may be formed along the entireties of the outer edges 36*a* or along at least a portion of the outer edges 36*a*. It is not necessary that the intrusive portion 4Q be formed along the outer edges 36*a*, and the intrusive portion 4Q may also be formed along the outer edge 36*b*. Such a structure can be formed by, for example, removing the core 30 along the outer edge 36*b* by increasing the irradiation time or the output of the laser light directed to the outer edge 36*b* in the surface treatment step, as described above.

The outer electrode 4 formed on the end face 14 may also have the intrusive portion 4Q. More specifically, the intrusive portion 4Q may be formed along the outer edges 36*c*. The intrusive portion 4Q may also be formed along the outer edge 36*d* by, for example, a method similar to that for forming the intrusive portion 4Q along the outer edge 36*b*. The above-described structure may be applied to one or both of the pair of end faces 14 of the inductor 1.

In the present embodiment, the first scanning SC1 and the second scanning SC2 illustrated in FIG. 5 are examples of irradiation with laser light performed in the surface treatment step. In the surface treatment step, reciprocal scanning of the laser light may be performed in directions along the length direction DL. In this case, the core 30 is removed when the scanning direction of the laser light is changed at the outer edge 36*b* and the outer edge 36*d*, and therefore the intrusive portion 4Q is formed at the outer edges 36*b* and 36*d*. In addition, in this case, the intrusive portion 4Q can be formed at the outer edges 36*a* and 36*c* by adjusting the output and the irradiation time of the laser light so that the core 30 is removed at the outer edges 36*a* and 36*c*.

Note that each of the above-described embodiments and modifications is an example of one aspect of the present disclosure, and any modifications and applications are possible without departing from the spirit of the present disclosure.

In addition, unless otherwise specified, directions, such as horizontal and vertical directions, various numerical values, shapes, and materials in the above-described embodiments include ranges (so-called equivalent ranges) in which the same effects as those of the directions, numerical values, shapes, and materials are obtained.

Configurations Supported by the Embodiments

The above-described embodiments support the following configurations.

(Configuration 1) An inductor including a base body including a coil conductor and a core in which the coil conductor is embedded, the coil conductor including a band-shaped conductive wire that is wound, the core containing soft magnetic particles and a resin, wherein the base body is rectangular-parallelepiped-shaped and includes a pair of principal faces that are opposite to each other, a pair of end faces that are opposite to each other and adjacent to the principal faces, and a pair of side faces that are opposite to each other and adjacent to the principal faces, wherein a base-body protection layer is formed on a surface of the base body, wherein the coil conductor includes a wound section and a pair of extended sections extending from the wound section, the extended sections having surfaces exposed on the surface of the base body at respective exposed portions on each of which a metal layer that is an outer electrode is formed by plating, and wherein the metal layer of the outer electrode is formed on an electrode formation section, which is not covered by the base-body protection layer, and on the base-body protection layer along an outer edge of the electrode formation section, and is also formed to extend into the base body at a boundary between the electrode formation section and the base-body protection layer.

According to the inductor of Configuration 1, the outer electrode is formed on each exposed portion that extends from the coil conductor embedded in the base body, and is also formed on the electrode formation section that is not covered by the base-body protection layer on the base body. The outer electrode is formed on the base-body protection layer and extends into the base body. Since the outer electrode extends into the base body, the outer electrode is strongly joined to the base body. The outer electrode is also joined to the exposed portion and the surface of the base body from which the base-body protection layer is removed. Therefore, the outer electrode is more strongly joined to the base body, so that the peel strength of the outer electrode can be increased.

(Configuration 2) The inductor according to Configuration 1, wherein the outer electrode extends into the base body to a depth of 5 μm or more from the surface of the base body. According to the inductor of Configuration 2, the effect of increasing the joining strength between the outer electrode and the base body provided by the outer electrode extending into the base body can be enhanced.

(Configuration 3) The inductor according to Configuration 1 or 2, wherein the metal layer of the outer electrode extends into the base body in a wedge shape.

According to the inductor of Configuration 3, the outer electrode extends into the base body in a wedge shape, so that the joining strength between the outer electrode and the base body can be more effectively increased.

(Configuration 4) The inductor according to any one of Configurations 1 to 3, wherein the exposed portions are exposed on respective ones of the end faces of the base body, and wherein the metal layer of the outer electrode is formed on each end face and one of the principal faces and extends into the base body at a boundary between the electrode formation section and the base-body protection layer on the one of the principal faces.

According to the inductor of Configuration 4, the outer electrode is joined to the exposed portion on each end face of the base body, and is strongly joined to the base body by extending into the base body in a wedge shape on the principal face of the base body. Therefore, the outer electrode is more strongly joined to the base body, so that the peel strength of the outer electrode can be increased.

(Configuration 5) A method for manufacturing an inductor, the method including a coil conductor formation step of forming a coil conductor by winding a band-shaped conductive wire; a base body molding step of molding a base body by embedding the coil conductor in a core containing soft magnetic particles and a resin and compressing the core, the coil conductor being embedded such that a surface of an extended section extending from a wound section of the coil conductor is exposed on a surface of the core; and a base-body protection layer formation step of forming a base-body protection layer on an entire surface of the base body. The method further includes a step of forming an electrode formation section by irradiating an area including an exposed portion at which the surface of the extended section is exposed with laser light to remove the base-body protection layer; and a step of forming a metal layer that is an outer electrode on the electrode formation section including the exposed portion. The metal layer of the outer electrode is formed on the electrode formation section and on the base-body protection layer along an outer edge of the electrode formation section, and is also formed to extend into the base body at a boundary between the electrode formation section and the base-body protection layer.

According to the method for manufacturing the inductor of Configuration 5, the outer electrode is joined to the base-body protection layer that covers the entirety of the surface of the base body, the electrode formation section, and the inside of the base body. Therefore, the peel strength of the outer electrode of the inductor can be increased.

What is claimed is:

1. An inductor comprising:

a base body including a coil conductor and a core in which the coil conductor is embedded, the coil conductor including a band-shaped conductive wire that is wound, the core containing soft magnetic particles and a resin; and a base-body protection layer is on a surface of the base body, wherein the coil conductor includes a wound section and a pair of extended sections extending from the wound section, the extended sections having surfaces exposed on the surface of the base body at respective exposed portions on each of which a metal layer that is an outer electrode is disposed, the metal layer of the outer electrode is on an electrode formation section, which is not covered by the base-body protection layer, and on the base-body protection layer along an outer edge of the electrode formation section, and extends into the base body at a boundary between the electrode formation section and the base-body protection layer, the outer electrode extends into the base body to a depth of 5 μm or more from the surface of the base body, and the metal layer of the outer electrode extends into the base body in a wedge shape.

2. The inductor according to claim 1, wherein the base body is rectangular-parallelepiped-shaped and the surface includes a pair of principal faces that are opposite to each other, a pair of end faces that are opposite to each other and adjacent to the principal faces, and a pair of side faces that are opposite to each other and adjacent to the principal faces, the exposed portions are exposed on respective ones of the end faces of the base body, and the metal layer of the outer electrode is on each end face and one of the principal faces and extends into the base body at a boundary between the electrode formation section and the base-body protection layer on the one of the principal faces.

3. The inductor according to claim 1, wherein the metal layer of the outer electrode includes an overlapping portion that is on the electrode formation section, which is not covered by the base-body protection layer, and on the base-body protection layer along an outer edge of the electrode formation section, such that a first end of the overlapping portion is on the electrode formation section and a second end of the overlapping portion, opposite to the first end, is on the base-body protection layer, and the overlapping portion extends outward from the base body between the first end and the second end.

4. A method for manufacturing an inductor, the method comprising:

forming a coil conductor by winding a band-shaped conductive wire;

molding a base body by embedding the coil conductor in a core containing soft magnetic particles and a resin and compressing the core, the coil conductor being embedded such that a surface of an extended section extending from a wound section of the coil conductor is exposed on a surface of the core;

forming a base-body protection layer on an entire surface of the base body;

forming an electrode formation section by irradiating an area including an exposed portion at which the surface of the extended section is exposed with laser light to remove the base-body protection layer; and forming a metal layer that is an outer electrode on the electrode formation section including the exposed portion, wherein the metal layer of the outer electrode is formed on the electrode formation section and on the base-body protection layer along an outer edge of the electrode formation section, and is also formed to extend into the base body at a boundary between the electrode formation section and the base-body protection layer, the outer electrode extends into the base body to a depth of 5 μm or more from the surface of the base body, and the metal layer of the outer electrode extends into the base body in a wedge shape.

5. The method according to claim 4, wherein the metal layer of the outer electrode includes an overlapping portion that is on the electrode formation section, which is not covered by the base-body protection layer, and on the base-body protection layer along an outer edge of the electrode formation section, such that a first end of the overlapping portion is on the electrode formation section and a second end of the overlapping portion, opposite to the first end, is on the base-body protection layer, and the overlapping portion extends outward from the base body between the first end and the second end.

6. An inductor comprising:

a base body including a coil conductor and a core in which the coil conductor is embedded, the coil conductor including a band-shaped conductive wire that is wound, the core containing soft magnetic particles and a resin; and a base-body protection layer is on a surface of the base body, wherein the base body is rectangular-parallelepiped-shaped and the surface of the base body includes a pair of principal faces that are opposite to each other, a pair of end faces that are opposite to each other and adjacent to the principal faces, and a pair of side faces that are opposite to each other and adjacent to the principal faces, the coil conductor includes a wound section and a pair of extended sections extending from the wound section, the extended sections having surfaces exposed on the surface of the base body at respective exposed portions on each of which a metal layer that is an outer electrode is disposed, the metal layer of the outer electrode is on an electrode formation section, which is not covered by the base-body protection layer, and on the base-body protection layer along an outer edge of the electrode formation section, and extends into the base body at a boundary between the electrode formation section and the base-body protection layer, and the outer electrode extends onto one of the principal faces and one of the end faces, and is absent from the other of the principal faces, the other of the end faces, and the side faces.

* * * * *